Patented Dec. 26, 1939

2,184,886

UNITED STATES PATENT OFFICE 2,184,886

ORGANIC COMPOSITION OF HIGH CHLORINE CONTENT

Irving E. Muskat, Akron, and Albert G. Chenicek, Barberton, Ohio, assignors to Pittsburgh Plate Glass Company, Allegheny County, Pa., a corporation of Pennsylvania No Drawing. Application June 25, 1938, Serial No. 215,870

17 Claims. (Cl. 260—248)

This invention relates to chlorinated heterocyclic nitrogen compounds of great stability and high active chlorine content and to methods of producing such compounds.

In accordance with our invention, we have discovered certain compounds of high active chlorine content which may be derived from the amides or imides of cyanuric acid. We have found that soluble, stable compositions containing active chlorine, preferably in concentrations upwards of 40 percent, may be prepared by chlorination of the amides or imides of cyanuric acid or derivatives thereof. Of particular interest are the products which may be derived from the chlorination of ammeline, ammelide or melamine or mixtures thereof. It is found that when these materials are chlorinated, solid compositions which are stable over a period of many months and which may contain in excess of 100 percent active chlorine are produced.

The exact chemical structure of the products so produced is unknown but it appears that they are mixtures containing the corresponding N-chloro derivatives of the imides or amides of cyanuric acid wherein one or more hydrogen atoms are replaced by chlorine atoms. It should be understood, however, that we do not wish to be bound by a theoretical explanation of the chemical structure of the composition since the reaction is apparently somewhat complex. In general, the products are solid crystalline substances containing up to as high as 129 percent active chlorine and vary in color from white to orange in accordance with the amount of chlorine which they contain. These products are slightly soluble in water, and more soluble in aqueous alkaline solutions, and in triacetin, ethyl acetate and acetonyl acetone. In general, the products of high chlorine content are more soluble in organic solvents such as chloroform or carbon tetrachloride and less soluble in water than those which contain less chlorine. When dissolved, they form solutions containing active chlorine which are stable for a long period of time. Upon hydrolysis of a quantity of our chlorinated compounds, ammeline, ammelide and/or melamine is produced.

In a similar manner, we have found that derivatives of ammeline, ammelide or melamine such as the sodium, potassium, calcium, barium or other alkali or alkaline earth salts thereof, or organic or amino or cyano-organic derivatives thereof, such as N-methylated, N-ethylated or other N-arylated or alkylated compounds of melamine, ammeline or ammelide, may be chlorinated to form similar products containing active chlorine.

The products may be chlorinated in the pure state if desired, but this is in no way necessary since mixtures containing ammeline, ammelide and/or melamine as an ingredient may be chlorinated. Since ammeline and ammelide are sometimes prepared together and are difficult to separate, mixtures of these materials may be chlorinated.

The chlorination may be effected in a suitable manner as, for example, by chlorination in the dry state or by chlorination of fluid dispersions of the materials. Such dispersions may be in the form of true solutions or colloidal solutions or suspensions of the materials to be treated. We have found that an effective chlorination may be secured by passing chlorine through an aqueous slurry of the cyanuric acid amides or imides. In a similar manner, the products may be chlorinated in other suitable inert solvents or suspension media such as carbon tetrachloride, chloroform, etc., or by chlorinating in the presence of a gaseous diluent such as air, carbon dioxide, nitrogen, etc.

The time and rate of chlorination of these compounds is capable of considerable variation and it is found that the amount of chlorine in the final product may be controlled to some degree by controlling these factors. The reaction has been carried out at temperatures from 0° C. upward and it has been found that to some extent, an increase in temperature may permit an increase in the amount of chlorine absorbed by the composition. In general, treatment at room temperature gives satisfactory results.

Since the chlorinated product is somewhat soluble in water, it will be apparent that the aqueous filtrate such as may be obtained after treatment of aqueous slurries, in accordance with our invention, may be substantially saturated with the chlorinated material. This solution may, if desired, be recycled for use as the aqueous medium in which other portions of material are to be chlorinated or may be used as a disinfecting, bleaching or sterilizing liquor.

The following examples illustrate the invention:

*Example I.*—An aqueous slurry containing 100 grams per liter of ammeline was prepared and a stream of chlorine bubbled into the slurry for two hours at a temperature of 8–10° C. at a rate of 0.7 gram per minute per liter of slurry. The slurry was then filtered and a white solid product containing 69 percent chlorine was thereby obtained. The solid product was found to be fairly soluble in water, aqueous alkaline solutions, triacetin, acetonyl acetone and ethyl acetate. By analysis, it contained 33.8% chlorine, 17.9% carbon, 29.9% nitrogen, 2.0% hydrogen and 16.4% oxygen. This analysis corresponds roughly to the theoretical analysis of the dichloroammeline containing one mole of water of crystallization.

*Example II.*—An aqueous slurry containing 97 grams per liter of melamine was prepared and a stream of chlorine was bubbled into the slurry at a rate of approximately 0.75 gram per minute per liter of slurry at a temperature of 0–10° C. for 4 hours. The slurry was filtered and a white solid product containing 73 percent active chlorine was thus obtained. By analysis, this product contained 42.4 percent chlorine, 33 percent nitrogen, 19 percent carbon and 2.6 percent hydrogen and 3 percent oxygen. The product was soluble in triacetin, acetonyl acetone, ethyl acetate, water and aqueous alkaline solutions.

*Example III.*—An aqueous slurry containing 65 grams per liter of melamine and 60 grams per liter of calcium hydroxide was treated with a stream of chlorine at a temperature of 13–15° C. at a rate of 0.75 gram of chlorine per minute per liter of slurry for a period of 6 hours. The product produced was a yellow-orange colored solid containing 88.5% active chlorine and was soluble in the usual solvents. By analysis, it contained 43.7 percent chlorine, 30.6 percent nitrogen, 16.7 percent carbon, 1.4 percent hydrogen and 7.6 percent oxygen. Upon hydrolysis of this product, a substantial quantity of ammeline, ammelide and melamine was obtained.

*Example IV.*—An aqueous slurry containing 65 grams per liter of ammeline and 60 grams per liter of calcium hydroxide was chlorinated in a manner similar to that described in Examples I–III at a temperature of 10–15° C. for 7 hours. The product obtained was an orange colored solid containing 92 percent active chlorine and was soluble in water, acetonyl acetone, triacetin, ethyl acetate and in aqueous alkaline solutions. By analysis, it contained 45 percent chlorine, 25 percent nitrogen, 15 percent carbon, 1.5 percent hydrogen and 14.5 percent oxygen.

The products may be mixed with various materials having alkaline reactions such as alkali metal hydroxides, carbonates or alkaline earth hydroxides or carbonates. The solubility of the chlorinated product appears to be increased in alkaline solutions, for example, in solutions containing sodium hydroxide, sodium bicarbonate, sodium phosphates or sodium carbonate. Often it may be desirable to chlorinate in the presence of these agents as illustrated in Example III.

These alkaline materials may form corresponding hypochlorites during chlorination and, if desired, the cyanuric acid amides or imides may be chlorinated in the presence of substantial quantities of these substances to yield compositions of high stability and sterilizing or bleaching properties containing both the chlorinated product and a suitable hypochlorite. Mixtures containing chlorinated amides or imides of cyanuric acid such as chlorinated melamine or chlorinated ammeline or ammelide and hypochlorites appear to be more stable as to active chlorine content than the corresponding hypochlorites alone.

Chlorination in the presence of alkaline materials, suitably calcium hydroxide, sodium carbonate, etc., appears to promote the absorption of further quantities of chlorine. In addition, it is sometimes advantageous to add certain other compounds such as phosphates or silicates to the composition before, during or after chlorination.

While we have described the chlorination of these compounds by use of chlorine, it is obvious that other sources of chlorine, such as hypochlorous acids, chlorous acid, or the salts thereof, chlorine oxides such as chlorine monoxide, etc., may also be used.

These compounds prepared in accordance with our invention may be used as bleaching, sterilizing or disinfecting agents. Very desirable products of high sterilizing properties may be produced by mixing dispersions of these materials with detergent compositions such as soaps, phosphated or sulphated alcohols such as the sulphates and phosphates of primary or secondary aliphatic alcohols, such as octyl, lauryl, oleyl or hexyl alcohol; alkali metal phosphates such as trisodium phosphate or sodium hexametaphosphate, organic sulphonic acids or salts thereof, such as Turkey red oil, isopropyl naphthalene sodium sulphonate or toluene sulphonic acid, etc., alkali metal carbonates, silicates, etc. Other uses thereof will occur to those skilled in the art.

Although the present invention has been described in connection with the specific details of certain embodiments thereof, it is not intended that such details shall be considered as limitations upon the scope of the invention except insofar as included in the accompanying claims. This application is a continuation-in-part of copending application Serial No. 179,956, filed December 15, 1937.

We claim:

1. A chlorinated amide of cyanuric acid characterized in that a substantial amount of the chlorine in said chlorinated amide is present as active chlorine.

2. Chlorinated ammeline characterized in that a substantial amount of the chlorine in said chlorinated ammeline is present as active chlorine.

3. Chlorinated ammelide characterized in that a substantial amount of chlorine in said chlorinated ammelide is present as active chlorine.

4. A composition of matter comprising chlorinated ammeline and ammelide characterized in that a substantial amount of chlorine in said chlorinated composition is present as active chlorine.

5. A chlorinated amide of cyanuric acid containing upwards of 40 percent active chlorine.

6. A composition of matter of high sterilizing properties comprising a chlorinated compound of the group consisting of the amides and imides of cyanuric acid characterized in that a substantial amount of chlorine in said chlorinated composition is present as active chlorine.

7. The process of preparing a composition of high active chlorine content which comprises treating a compound of the group consisting of the amides and imides of cyanuric acid with a chlorinating agent.

8. The process of preparing a composition of high active chlorine content which comprises treating ammeline with a chlorinating agent.

9. The process of preparing a composition of high active chlorine content which comprises treating ammelide with a chlorinating agent.

10. The process of preparing a composition of high active chlorine content which comprises chlorinating an aqueous dispersion of a compound of the group consisting of the amides and imides of cyanuric acid.

11. The process of preparing a composition of high active chlorine content which comprises chlorinating an aqueous dispersion of ammeline.

12. The process of preparing a composition of high active chlorine content which comprises chlorinating an aqueous dispersion of ammelide.

13. The process of preparing a composition of high active chlorine content which comprises chlorinating an aqueous alkaline dispersion of a compound of the group consisting of the amides and imides of cyanuric acid.

14. The process of preparing a composition of high active chlorine content which comprises chlorinating an aqueous alkaline dispersion of ammeline.

15. The process of preparing a composition of high active chlorine content which comprises chlorinating an aqueous alkaline dispersion of ammelide.

16. The process of preparing a composition of high active chlorine content which comprises chlorinating a dispersion of a compound of the group consisting of the amides and imides of cyanuric acid in carbon tetrachloride.

17. The process of preparing a composition of high active chlorine content which comprises chlorinating a dispersion of a compound of the group consisting of the amides and imides of cyanuric acid in gaseous atmosphere.

ALBERT G. CHENICEK,
IRVING E. MUSKAT.